United States Patent
Unger et al.

(10) Patent No.: US 8,554,793 B2
(45) Date of Patent: Oct. 8, 2013

(54) METHODS AND SYSTEMS FOR PROVIDING CUSTOM SETTINGS IN AN ON-DEMAND SERVICE ENVIRONMENT

(75) Inventors: Richard Unger, Seattle, WA (US); Fiaz Hossain, San Francisco, CA (US); Taggart C Matthiesen, San Francisco, CA (US); Craig Weissman, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 266 days.

(21) Appl. No.: 12/974,641

(22) Filed: Dec. 21, 2010

(65) Prior Publication Data

US 2011/0258233 A1    Oct. 20, 2011

Related U.S. Application Data

(60) Provisional application No. 61/325,488, filed on Apr. 19, 2010.

(51) Int. Cl.
*G06F 17/30* (2006.01)

(52) U.S. Cl.
USPC .................................. 707/783; 707/E17.055

(58) Field of Classification Search
None
See application file for complete search history.

(56) References Cited

U.S. PATENT DOCUMENTS

| | | | |
|---|---|---|---|
| 5,577,188 A | 11/1996 | Zhu | |
| 5,608,872 A | 3/1997 | Schwartz et al. | |
| 5,649,104 A | 7/1997 | Carleton et al. | |
| 5,715,450 A | 2/1998 | Ambrose et al. | |
| 5,761,419 A | 6/1998 | Schwartz et al. | |
| 5,819,038 A | 10/1998 | Carleton et al. | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 6,092,083 A | 7/2000 | Brodersen et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,135 B1 | 4/2001 | Brodersen et al. | |
| 6,233,617 B1 | 5/2001 | Rothwein et al. | |
| 6,266,669 B1 | 7/2001 | Brodersen et al. | |
| 6,295,530 B1 | 9/2001 | Ritchie et al. | |
| 6,324,568 B1 | 11/2001 | Diec | |
| 6,324,693 B1 | 11/2001 | Brodersen et al. | |
| 6,336,137 B1 | 1/2002 | Lee et al. | |
| D454,139 S | 3/2002 | Feldcamp | |
| 6,367,077 B1 | 4/2002 | Brodersen et al. | |
| 6,393,605 B1 | 5/2002 | Loomans | |
| 6,405,220 B1 | 6/2002 | Brodersen et al. | |
| 6,434,550 B1 | 8/2002 | Warner et al. | |
| 6,446,089 B1 | 9/2002 | Brodersen et al. | |
| 6,535,909 B1 | 3/2003 | Rust | |

(Continued)

*Primary Examiner* — Anteneh Girma
(74) *Attorney, Agent, or Firm* — Blakely Sokoloff Taylor & Zafman LLP

(57) ABSTRACT

In accordance with embodiments, there are provided mechanisms and methods for providing custom settings in an on-demand service environment. In an embodiment and by way of example, a method providing custom settings in an on-demand service environment is provided. The method embodiment includes naming the custom object, creating fields for the custom object, assigning a behavior for each field, setting the custom object to a specified type, and if the custom object is of a hierarchical type, then assigning permissions to users with regarding the created fields.

21 Claims, 11 Drawing Sheets

(56) References Cited

U.S. PATENT DOCUMENTS

| | | |
|---|---|---|
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,340,411 B2 | 3/2008 | Cook |
| 7,620,655 B2 | 11/2009 | Larsson et al. |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0152102 A1 | 10/2002 | Brodersen et al. |
| 2002/0161734 A1 | 10/2002 | Stauber et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachadran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0088545 A1 | 5/2003 | Subramaniam et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0191743 A1 | 10/2003 | Brodersen et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2008/0082540 A1* | 4/2008 | Weissman et al. ............... 707/9 |
| 2011/0276892 A1* | 11/2011 | Jensen-Horne et al. ...... 715/744 |

* cited by examiner

Custom Settings
AccountMap Preferences

Custom Setting Detail    [Edit] [Delete]

| | | | |
|---|---|---|---|
| Setting Label | AccountMap Preferences | Object Name | AccountMap_Preferences |
| API Name | A123_AccountMap_Preferences | Description | |
| | | Namespace Prefix | A123 |
| Created by | Admin User, 2/2/2008 1:58PM | Modified by | Admin User, 2/2/2008 1:59PM |

Custom Fields    [New]

| Action ↙210 | Field Label | Data Type | Controlling Field | Modified By |
|---|---|---|---|---|
| Edit \| Del | Display Map | Checkbox | | Admin User, 2/2/2008 2:03PM |
| Edit \| Del \| Replace | Geographic Locale | Picklist | | Admin User, 2/2/2008 2:02PM |
| Edit \| Del | OrgLevel | Checkbox | | Admin User, 2/2/2008 2:10PM |
| Edit \| Del | ProfileID | Text(18) | | Admin User, 2/2/2008 2:10PM |
| Edit \| Del | Show Legend | Checkbox | | Admin User, 2/2/2008 2:04PM |
| Edit \| Del | Show Satellite | Checkbox | | Admin User, 2/2/2008 2:08PM |
| Edit \| Del | UserID | Text(18) | | Admin User, 2/2/2008 2:10PM |

Triggers    [New]

*FIG. 2B*

Custom Settings
Create Custom Fields

| Custom Setting Detail | |
|---|---|
| Next | Cancel |

| | | |
|---|---|---|
| ○ | Currency | Allows users to enter a dollar or other currency amount and automatically formats the field a s currency amount. This can be useful if you export data to Excel or another spreadsheet. |
| ○ | Date | Allows users to enter a date or pick a date from a popup calendar. |
| ○ | Date/Time | Allows users to enter a date and time, or pick a date from a popup calendar. When users click a date in the popup, that date and the current time are entered into the Date/Time field. |
| ○ | Email | Allows users to enter an email address. The entered address is validated to ensure that it is in the proper format. Users can then click on the field to automatically launch their email program and send an email to that address. |
| ○ | Number | Allows users to enter any number. Leading zeros are removed. |
| ○ | Percent | Allows users to enter a percentage number, for example, 10 and automatically adds the percent sign to the number. |
| ○ | Phone | Allows users to enter any phone number. Automatically formats it as a phone number. |
| ○ | Picklist | Allows users to select a value from a list you define. |
| ○ | Picklist (Multi-select) | Allows users to select multiple values from a list you define. |
| ● | Text | Allows users to enter any combination of letters and numbers. |
| ○ | Text Area | Allows users to enter up to 255 characters on separate lines. |
| ○ | URL | Allows users to enter any valid website address. When users click on the field, the URL will open in a separe browser window. |

*FIG. 2C*

Custom Settings
New Custom Fields ~232

Custom Settings ~234

[Save] [Cancel] ~236

Field Label [____]

Please enter the maximum length for a text field below.
Length [____] ~238

Field Name [____] ~240

Description [____] ~242

Required ☐ Always require a value in this field in order to save a record — 244

Unique ☐ Do not allow duplicate values — 246
⦿ Treat "ABC" and "abc" as duplicate values (case insensitive)
○ Treat "ABC" and "abc" as different values (case sensitive)

External ID ☐ Set this field as the unique record identifier from an external system — 248

Default Value [____] ~250

*FIG. 2D*

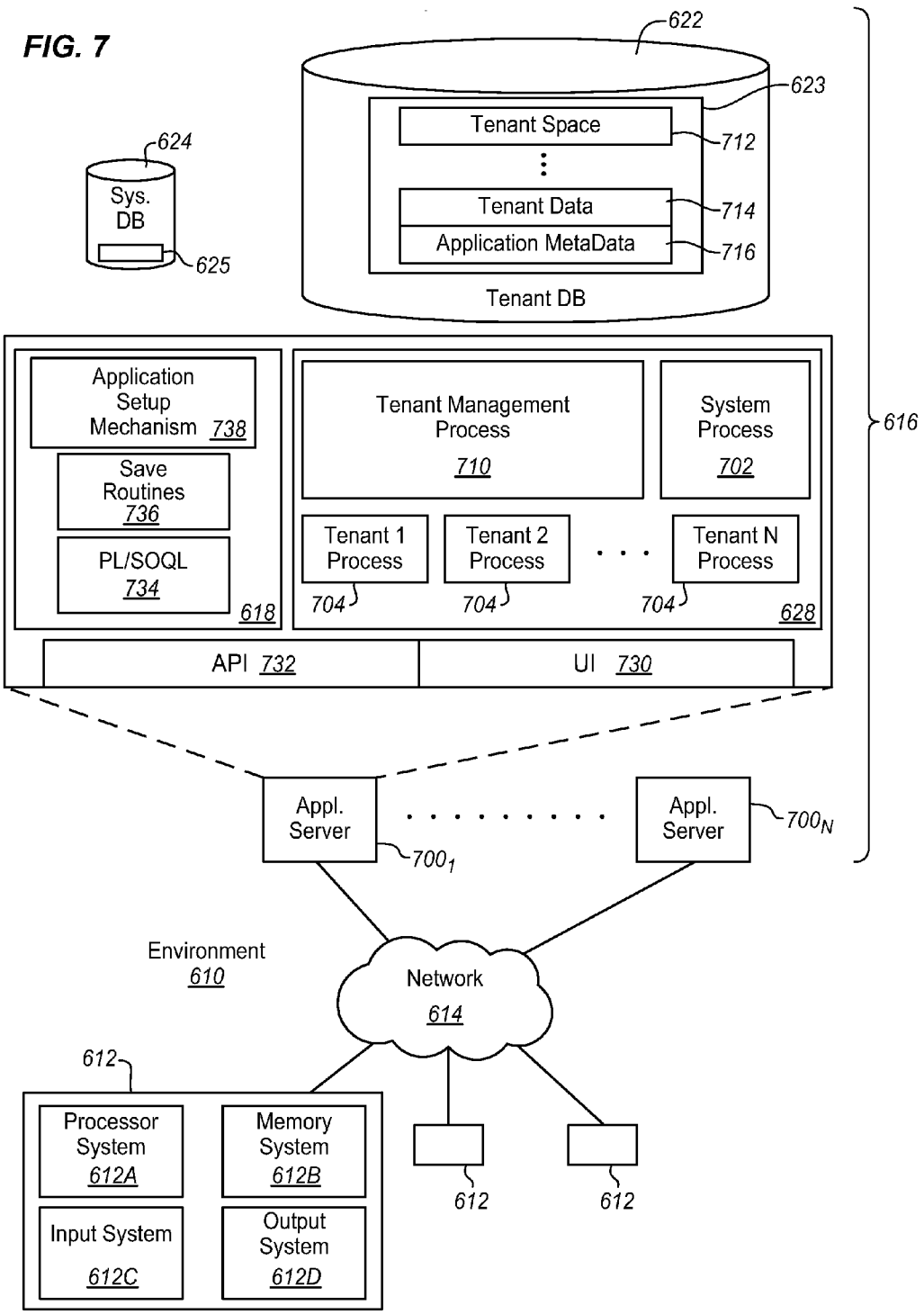

METHODS AND SYSTEMS FOR PROVIDING CUSTOM SETTINGS IN AN ON-DEMAND SERVICE ENVIRONMENT

CLAIM OF PRIORITY

This application claims the benefit of U.S. Provisional Patent Application No. 61/325,488 entitled Methods and Systems for Appending Providing Custom Settings In An On-Demand Service Environment, by Unger et al., filed Apr. 19, 2010, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present disclosure relates to providing custom settings in an on-demand service environment and, in particular, to creating and editing custom settings for users and organizations.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

In conventional database systems, users access their data resources in one logical database. A user of such a conventional system typically retrieves data from and stores data on the system using the user's own systems. A user system might remotely access one of a plurality of server systems that might in turn access the database system. Data retrieval from the system might include the issuance of a query from the user system to the database system. The database system might process the request for information received in the query and send to the user system information relevant to the request. The rapid and efficient retrieval of accurate information and subsequent delivery of this information to the user system in a manner that is easy to understand has been and continues to be a goal of administrators of database systems.

Unfortunately, conventional database approaches might confuse the user or be difficult to use if the data is not presented in a convenient way and combined with other data from other sources or from additional searches. While such benefits can be provided with powerful and additional searches, the database system may process a query relatively slowly if, for example, a relatively large number of users substantially concurrently demand deeper and wider levels of information presented in an easier to user form.

Accordingly, it is desirable to provide techniques enabling applications to call custom objects that can access supplemental data from local cache to combine with the query results from the database system.

BRIEF SUMMARY

In accordance with embodiments, there are provided mechanisms and methods for providing custom settings in an on-demand service environment. These mechanisms and methods for providing custom settings in an on-demand service environment can enable embodiments to provide fast and ready access to custom views and functions using a cache from the application for which the custom setting were created. The ability of embodiments to provide custom setting from a cache can enable more efficient and reduced database querying and use.

In accordance with embodiments, there are provided mechanisms and methods for providing custom settings in an on-demand service environment. In an embodiment and by way of example, a method providing custom settings in an on-demand service environment is provided. The method embodiment includes naming the custom object, creating fields for the custom object, assigning a behavior for each field, setting the custom object to a specified type, and if the custom object is of a hierarchical type, then assigning permissions to users with regarding the created fields.

While one or more implementations and techniques are described with reference to an embodiment in which method and systems for providing custom settings in an on-demand service environment is implemented in a system having an application server providing a front end for an on-demand database service capable of supporting multiple tenants, the one or more implementations and techniques are not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples of the invention, the invention is not limited to the examples depicted in the figures.

FIGS. 2A-2D illustrate a diagram of a user interface for creating or editing the features of a custom setting in an embodiment;

FIG. 7 illustrates a block diagram of an embodiment of elements of FIG. 6 and various possible interconnections between these elements.

DETAILED DESCRIPTION

General Overview

Figure 1:
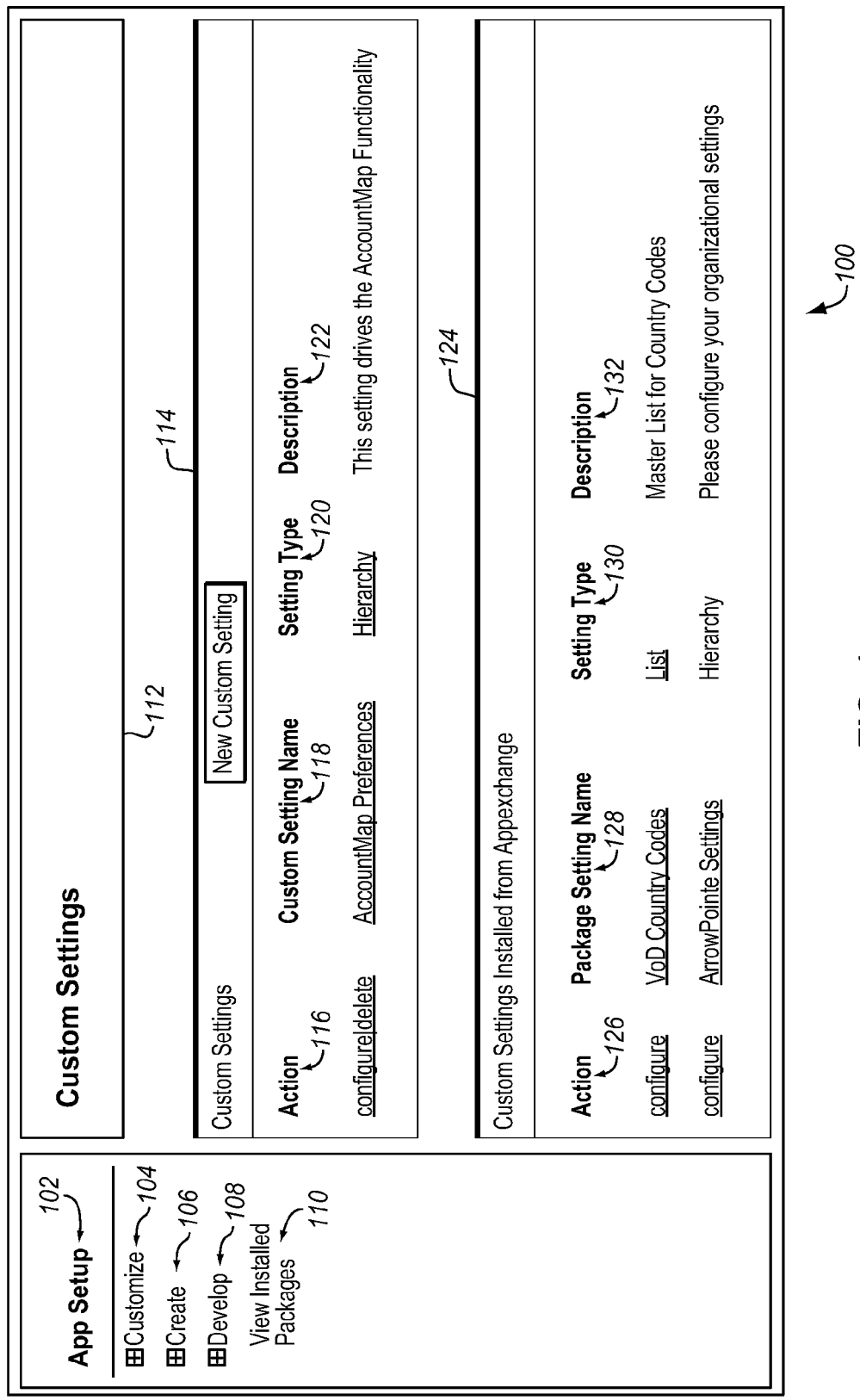
FIG. 1 illustrates a diagram of a user interface for establishing custom settings in an embodiment.

Systems and methods are provided providing custom settings in an on-demand service environment. These systems and methods are particularly valuable in the context of a multi-tenant database.

As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system.

Database applications are enhanced using metadata for service. Metadata can allow users to add custom fields, create custom objects, and to control create, read, update and delete access across the system based on profiles, identities and user groups.

With some metadata-rich platforms, developers package a custom object or set of custom objects that control the behavior of an application for users within their application. A packaged custom object can inhibit a user's access to the custom objects and increase the number of queries performed on the database. In other cases, a packaged custom object might not preserve security access rights.

The custom setting structure described below uses two mechanisms. First, custom settings lists are created at the application level. These lists can be stored as application caches accessible through an API.

Second, the actual settings are created and associated with users at organization, profile, and user levels. When the application invokes a custom setting it can make a call into the API. The API can then traverse the users, profiles, and organizations within the cache to determine the values of the custom settings for the current status of the application.

Both mechanisms will expose the data within the application cache to the application and possibly to the user. This enables efficient access to these objects without the cost of a query to the system. Examples of where these objects will be accessible include: Apex Code; Scontrols; Apex Pages; Validation Rules; and Formula Fields.

The custom settings correspond to objects accessible by particular applications through an API. The API is used to enable the association to applications. In other words, the API abstracts the caller, which is the application, from the settings hierarchy. By storing these settings in an application cache, the cache can be traversed before an application accesses the database. This allows any database query to be more carefully focused for the particular user's needs. This reduces the amount of database resources consumed by the application overall.

A further benefit of using custom settings through an API is that the application is separate from the API and from the cache. The application can be changed, in some ways, without affecting the custom settings and the custom settings can be changed without affecting the application. The cache for the settings can even be restricted for application developers without interfering with the development of the application. Similarly, users and developers can modify the custom setting without any knowledge of the underlying application code. The API between the application and the cache allows the application code and the cache to be completely segregated.

Structure

Embodiment of the present invention provide an ability for customers to add custom fields, create custom objects, control create, read, update and delete access across their system on a profile level, etc, all with a point and click interface. This can be an enabling technology to simplify management of applications by a wide range of administrators and users.

In the example described herein there are two types of custom settings: 1) Application Settings, 2) Hierarchy Settings. The Application type may be used to provide the ability to create 1:N Settings at the Organizational level. Alternatively, the Application type may be applied to a different level. The Application settings affect the operation of an application. The Hierarchy type may be used to create settings at that differ at different levels within a hierarchy. Hierarchy levels can include the Organization, Profile, and User level. In the described example, the Hierarchy type is a singleton, that is for a given profile or user, there can only be one instance.

User Interface

FIG. 1 shows an example user interface in the form of a screen shot 100 for establishing custom settings. This view will be referred to as the Custom Settings Main Page. The user interface presents a directory of resources and services on a left side border. The particular resources and services can be modified to suit different implementations and different user desires and needs. In the illustrated example, only resources and services related to creating and developing applications and setting are shown. Many other types of resources and services may be provide depending on the particular user and the system in which the present invention is deployed.

The resource and services are grouped under a heading labeled "App Setup" 102. Different labels may be used and more headers may be used to provide more or fewer options. The application setup heading includes sub-headings for customizing 104, creating 106 and developing 108. Under the "Develop" heading 108, the user is offered an opportunity to view any installed packages 110. From a list of installed packages, the user or developer may then be able to apply other resources to customize the package, or create or develop new packages. Each header may have multiple sub-headers or specific choices within the hierarchical directory. While a hierarchical directory is shown, the directory may take any of a variety of other forms.

On the main part of the display, the user interface presents title bar 112, which identifies the displayed view as a main Custom Settings view in the title. The title bar also present a help option. The Custom Setting view includes main window 114 which contains an Action list 116 to display a choice of different actions to take, such as configure or delete custom settings. A Custom Setting Name list 118 allows the user to view and select any desired set of custom settings. In the illustrated example, there is only one choice, labeled AccountMap Preferences. A Setting type list 120 allows the user to see the type for each displayed custom setting. In the described example, a Custom Setting can be an application type or an hierarchical type, however, other types may also be developed to suit particular examples. Last a Description list 122 is shown to provide a short description of each listed custom setting. The description can be provided by the developer to aid in identifying a particular custom setting. In the illustrated example, the custom setting "AccountMap preferences" is described by "This setting drives the Account Map Functionality."

The Custom Setting View also provides a second window 124 to show additional custom settings from other sources. The illustrated example is a window for "Custom Settings installed from Appexchange." These custom settings have been installed from an external source, in this case an application exchange provided by the database service provider to allow users to enhance the usability of the database system. There may be more windows to show custom settings from more sources or multiple sources may be shown in a single window.

Like the Custom Settings window 114, the additional custom settings window 124 includes a lists for actions 126 to perform on each custom setting, the names 128 for each custom setting, a type 130 for each custom setting, and a description 132.

Figure 2A:
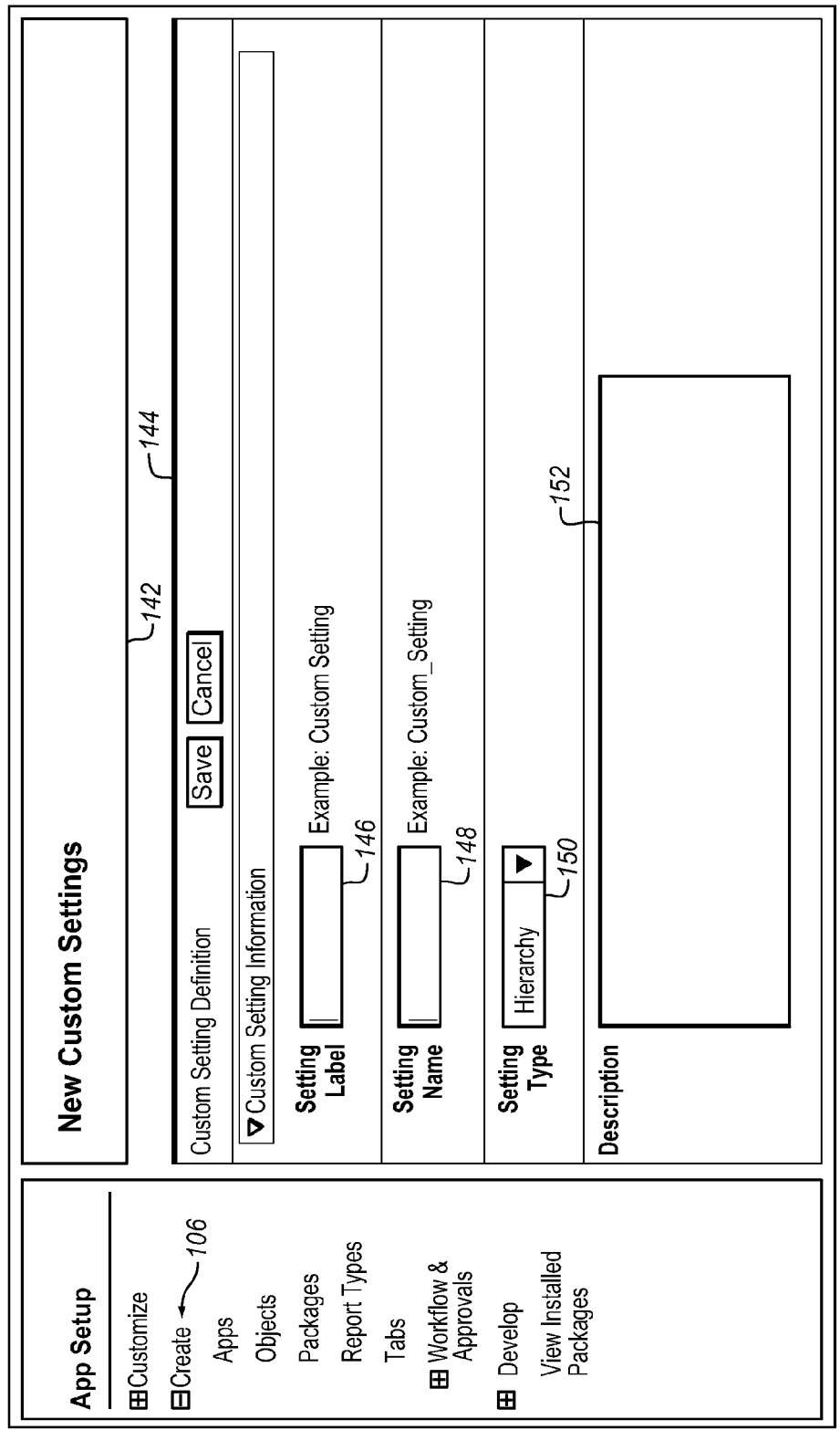

From the main Custom Settings window 112, a user or developer has an overview of all of the available custom settings and is able to modify or delete each one. In addition, the user or developer can create new custom settings as shown in FIGS. 2A to 2D. In FIG. 2A, the user has entered a "New Custom Settings" user interface as indicated in its title bar 142. Such an interface can be reached in a variety of different ways. In one example, the user selects "Create" 106 in the directory. In another example, the user selects the "New Custom Setting" button from the title bar of the Custom Settings window 114.

To create a new custom setting, the user may be presented with a Custom Settings Definition window 144. In this window, the user can provide a label for the custom setting in a label window 146. The label may be used when viewing the custom setting in any application to which it relates. The user may also provide a name for the new setting in a custom setting name window 148. The name may be used when referencing the setting via a formula field, an application, an API (Application Programming Interface) or in the main custom settings view of FIG. 1. The user can also set the type for the custom setting as application or list type or hierarchical using a pick list 150. The hierarchy type may be employed for personalization settings may be overridden at a profile or user level. The list type may be employed for application level lists, such as country codes. Finally, this window allows the user to provide a description in a text box 152. The type and description are the same kind of information that is shown for custom settings in FIG. 1.

Referring to the custom setting called AccountMap Preferences of FIG. 1, to use the user interface of FIG. 2A to create that custom setting, the user would enter, for example, Account Map Preferences for a label in the label box 146. For the name box 148, the user would have entered AccountMap Preferences. For the type, the user would have selected hierarchical, and for the description box 152, the user would have entered, "This setting drives the Account Map functionality."

In the illustrated example of FIG. 2A, the hierarchical directory can be used to navigate the screens or the user may go directly to the information windows to the right of the directory. As shown if the user has moved into windows creating a new custom setting, then the Create directory is expanded to show subtopics within the Create directory for Apps, Objects, Packages, Report Types, and Tabs. A subdirectory within the Create directory is shown for Workflow and Approvals.

Within the directory shown for Setup-Create-Custom Settings, administrators, with customize application permissions, may be allowed to have the ability to create Custom Settings definitions. Creating a Custom Settings definition is similar to creating a custom object definition. Depending on the implementation there can be several differences provided. In one example, there is no name field, there are no help settings, there are no reports on these objects, and the standard related objects are not supported. The standard related objects may include activities, notes and attachments. In addition, custom tabs may be excluded from a Custom Settings definition.

Additional differences between standard custom object definitions and Custom Settings object definitions can be provided depending on the particular implementation. In one example, there is no owner field, standard objects and standard custom objects cannot be related to Custom Settings objects, and custom buttons and links are not supported. In addition, search layouts and record types may also be excluded. These simplifications together with a single page layout allow Custom Settings, as described herein to be created, modified, used, and supported simply and easily.

FIG. 2B shows a detail view of the AccountMap Preference custom setting of FIG. 1. The title bar identifies the view and provides a link for help screens or utilities. A detail view 204 shows detailed information about the custom setting including the label, API name, object name, description, namespace prefix and creation and revision history with names and dates. A custom fields window 206 within the detail view shows all of the fields of the custom setting by label, data type, controlling field and revision history. An action column 210 allows the user to perform actions on the fields within the custom setting. The figure shows edit, delete, and replace actions. At the bottom of the view, a triggers window 208 is presented. In this example there are no triggers, however, the user may add a trigger by selecting new in the title bar for the window. All of the windows present buttons for adding and deleting any of the listed features.

FIG. 2C shows view for creating new custom fields. This view can be reached in a number of ways, including by selecting a new button in the title bar for the custom fields window of FIG. 2B. A title bar 222 identifies this as the Create Custom Fields view. The custom settings field window 224 then allows the user to select any of a variety of types of custom settings.

The example user interface of FIG. 2C shows a wide variety of possible custom fields for the custom settings as a set of selections. More or fewer custom fields may be provided, depending upon the particular implementation. The present example shows twelve possible choices.

Currency allows users to enter a dollar or other currency amount and it automatically formats the field as a currency amount. The formatting is useful for exporting data to other programs.

Date allow users to enter a date or pick a date from a popup calendar.

Date/Time allows users to enter a date and time, or to pick a date from a popup calendar. When users click a date in the popup calendar, the date and time are entered into this field.

Email allows user to enter and email address. The entered address is validated to ensure that it is in the proper format.

Users can then click on the field to automatically launch their email programs and send an email to that address.

Number allows user to enter any number. Leading zeroes may be removed.

Percent allows user to enter a percentage number, for example, 10 and the field automatically adds the percent sign to the number.

Phone allows user to enter any telephone number. The number is automatically formatted as a telephone number.

Picklist allows users to select a value from a list that is defined by the developer.

Picklist (Multi-Select) allows users to select multiple values from a list defined by the developer.

Text allows user to enter any combination of letters and numbers.

Text Area allows user to enter up to 255 characters on separate lines. The particular size of the text area and the types and number of characters supported can be adapted to suit different applications.

URL allows user to enter any valid website address. When users click on the field, the URL will open in a separate or a framed browser window.

After the user or developer makes a selection from the custom settings field window, the system moves to establish the features of the new field.

FIG. 2D shows an example display that can be provided to allow the user to further define the new custom field that was selected in the Create Custom Field display of the previous figure. In this example, the user has selected a text field. Accordingly, the new display with a title bar 232 entitled New Custom Field presents a custom settings window 234 for defining the features of the text field. While the displayed options are suitable for defining a text field, for other types of fields other options may be provided.

In this example, the user is provided with an interface to enter a field label using a text input box 236. The maximum length of the text field can be specified in another text box 238. A name can be specified for the field in another text box 240 and a description of the newly created text field can be specified in another text box 242. A variety of other features can also be presented depending on the particular implementation. In the illustrate example, the user may select several features using selection boxes. These may include that a value is required for this field before a record is saved 244. Duplicate values are prohibited or allowed 246. Case sensitivity can be turned on or off for duplicate values. An external identifier can be used as the unique record identifier suing a selection box 248 and a default value can be provided by the developer in a specified text box 250, if desired.

The example features shown in the custom setting window of FIG. 2D provide an example of the kinds of parameters that may be defined by a developer. Other aspects of the application or database system can be used to provide features that can be defined by the user. In one example, custom settings objects leverage a custom object user interface for field creation. These and similar options and features can also be presented to users upon selecting to edit a Custom Settings Object.

In one example, users with customize application permissions may be allowed to have the ability to update metadata objects. In addition to the displayed user interface, custom settings objects may also be managed through, Apex pages, and APIs.

Figure 3A:
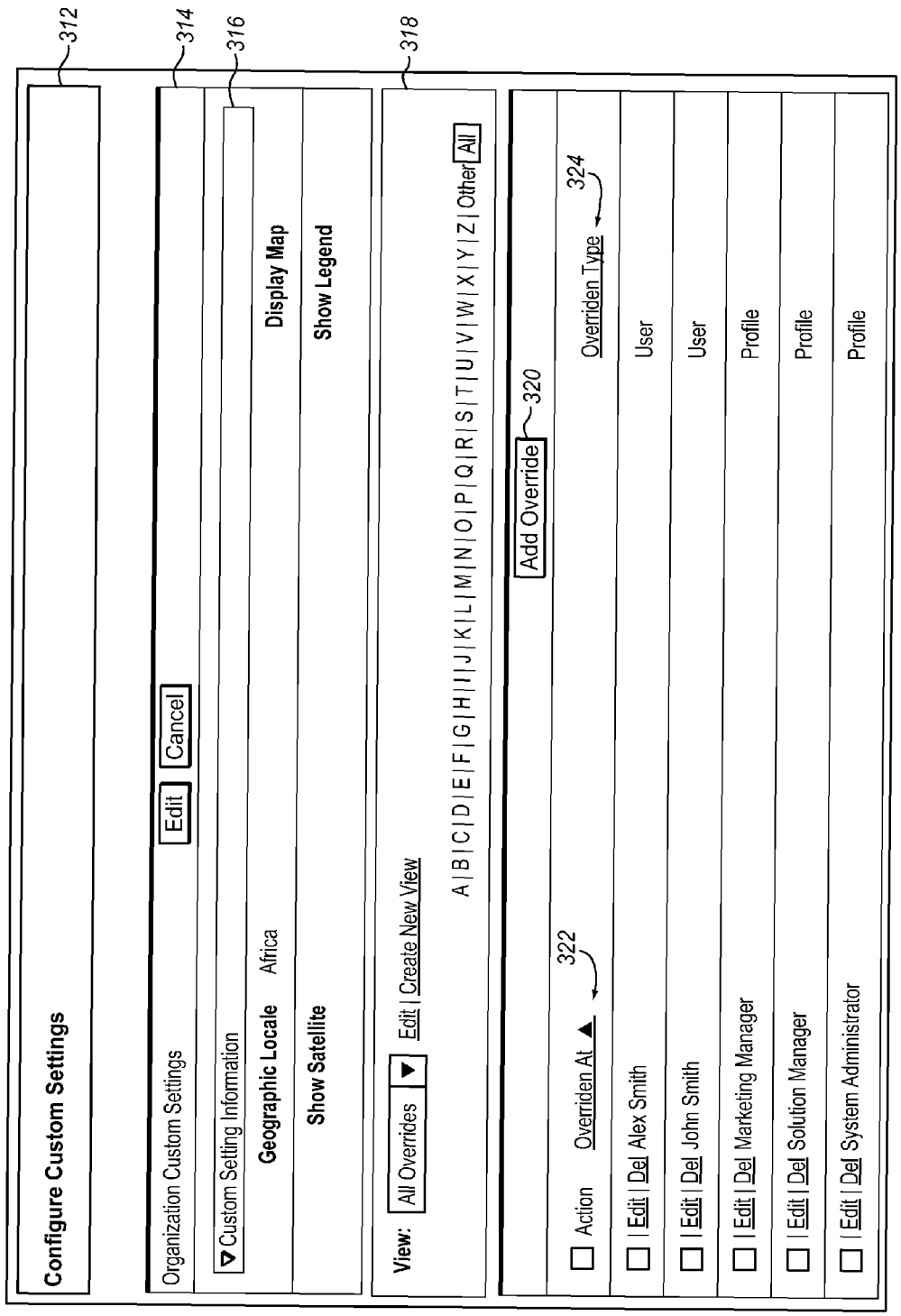
FIGS. 3A-3B illustrate a diagram of a user interface for establishing user permissions for a hierarchical type custom setting in an embodiment.

FIG. 3A shows how additional features of a hierarchy type custom setting can be managed through a special user interface. For hierarchy settings, two user interface pages may be used to support the creation and management of this data. The first page provides a detailed view of the settings at the Organization level as well as a list of overridden values at the Profile and User level. This is shown as FIG. 3A.

A tile bar 312 identifies the level in the process of configuring a new custom setting as "Configure Custom Settings." A further detail window 314 is labeled as "Organization Custom Settings." This window allows for edit and cancel options. The window provides custom setting information 316 at the top of the window. This may include a geographic location and functions to be performed such as display a map, show a legend, and show a satellite view. Additional or different information may be provided, depending on the particular implementation. This information is useful for the Account-Map Preferences custom setting referred to earlier.

An overrides view 318 can be used to allow the user or developer to control any overrides. In the illustrated example, the user has selected to show all overrides. The window then lists all of the overrides in a list 322 by user name. For each named user, the override may be edited or deleted using selection boxes and selection icons. The overrides also all feature an override type list 324 for each user. The override type may be based on the particular user identity or a profile. The develop can also select to add an override 320. This user interface, accordingly, allows the developer to add, remove and edit overrides of different types for each user.

Figure 3B:
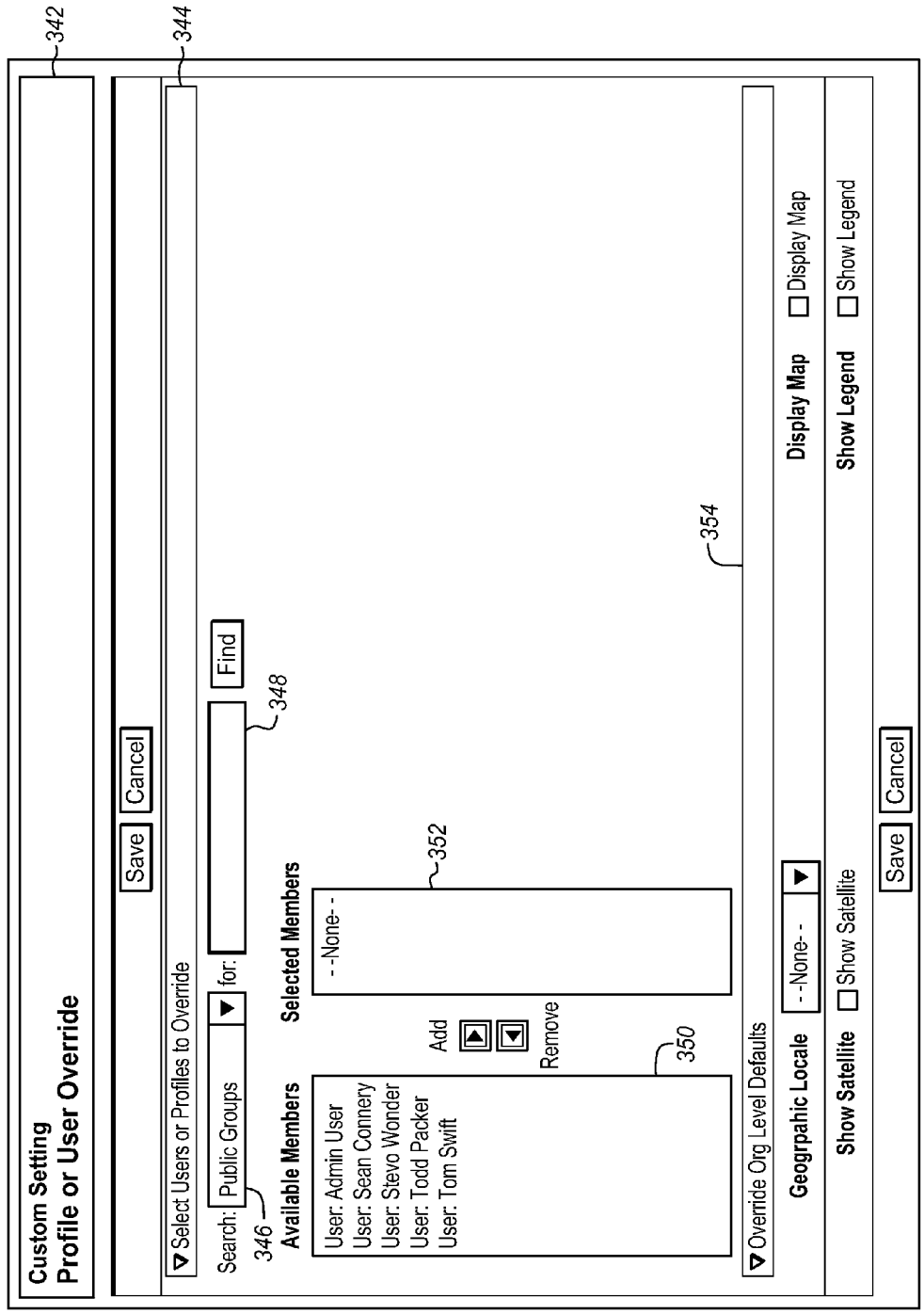

Org level values can also be overridden through the "add override" action 320. This action will render the user interface display of FIG. 3B, titled Profile or User Override 342.

Rather than the individual settings, org level values allows the mass selection of users and profiles. The settings associated to the selected user and profile can then be mass overridden. The user is provided with a first window 344 that allows the user to select users or profiles to override.

A user can begin to add overrides by searching for particular users or groups. In a pick list 346, a user can select a particular group of users to provide an override or to search within. In the illustrated example, the user has selected to search within the Public Groups. A text box 348, allows the user to search for a particular name or group within the selected group. In this example, the search box is not used and the results are shown in a list of results 350. The results show available members that match the search, in this case all of the users within the public group. Any one or more of these users can be added to a second box 352 that is the selected members. If any members had been selected already, then they could be removed from the list of selected members.

A second window 354 "Override Org Level Defaults" allows the user to pick the features of the class that will be overridden for the selected group. In the example class of FIG. 2B, the user may override the geographic locale, the satellite display, the map display, or the legend display. These are the primary features of the class. The user interface of FIG. 3B also allows the user to save or cancel any selections.

Figure 4:
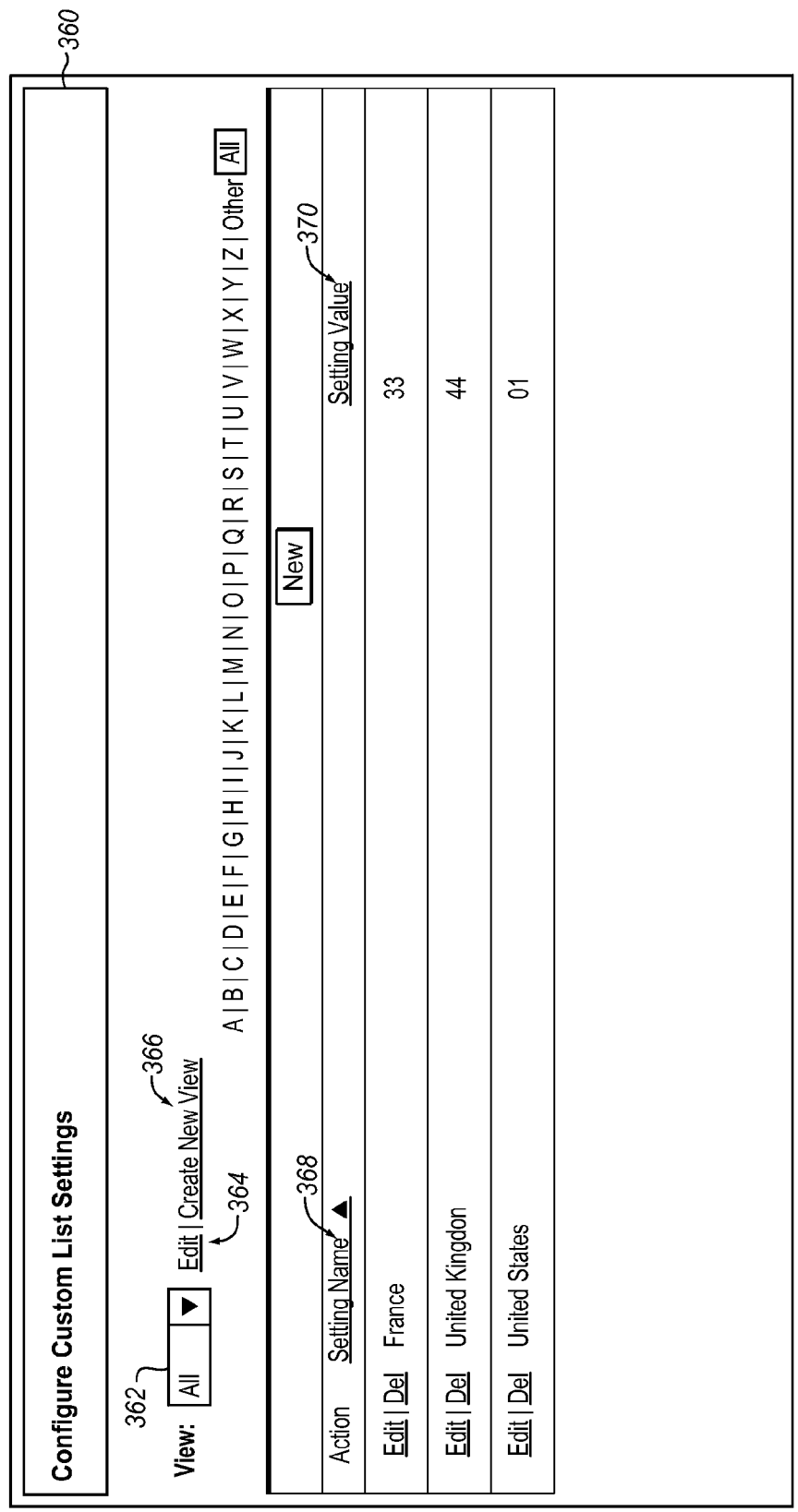
FIG. 4 illustrates a diagram of a user interface for establishing list features of a list type custom setting in an embodiment.

For List Settings, unlike Hierarchy settings, an override feature may not be desired. As shown in FIG. 4, however a user interface may be provided that will support the creation of 1:N of Setting objects at the Organization level. FIG. 4 shows a "Configure Custom List Settings" window 360. In this window, a user can select which custom settings to view from a view pick list 362. The user may then choose to edit the view 364 or create a new view 366.

For any particular view, the window allows the user to view the selected settings by name in a settings list 368 and see values for the setting 370. For each setting the user may edit or delete the setting or create new settings.

Access to the customization windows of FIGS. 1 to 4 can be managed using sharing and ownership permissions. Alternatively, permissions can be managed at the profiled level. For example, in the API, values are accessible through an OQL (Object Query Language). In Apex, values can be accessed from a Setup static type Use Cases In a first example, a developer may desire that an application allow users the ability to retrieve preferences at both the organization level and the user level. This is then used to provide personalization for features of an organizational map. This date may normally be stored within the organization's hosted infrastructure. However, storing the organization map and its features in another location requires the organization to query both its internal setup tables and the database to render the customized Map pages. This is inefficient and presents design concerns if the hosted pages are ported to the database platform. With the custom map setting, described above, the map preferences can be stored within the database platform as custom settings.

In a second example, a developer may provide a scheduling feature, providing customers the ability to define the level of scheduling at either an individual day or time of day. By leveraging the custom settings, the developer could set these preferences at the organization level and, for particular cases, override some of those preferences at the profile or user level. In addition, the developer may provide a visual map component of the scheduling feature which can be turned on or off within an individual organization. This feature could be managed through a custom preferences table. However, the custom settings approach described above, allows the developer to set and access the visual map component more efficiently, while the end result requires less processing resources. The custom settings approach can also be used to track and store user session attributes. These features may include a "view last seen" feature which tracks the last view rendered within a user session.

In a third example, a developer may maintain a list of country codes in a custom object within the application in which the country codes are used. By using custom settings instead of a data table query, for example, direct access to these values is provided directly from the cache.

Process

Figure 5:
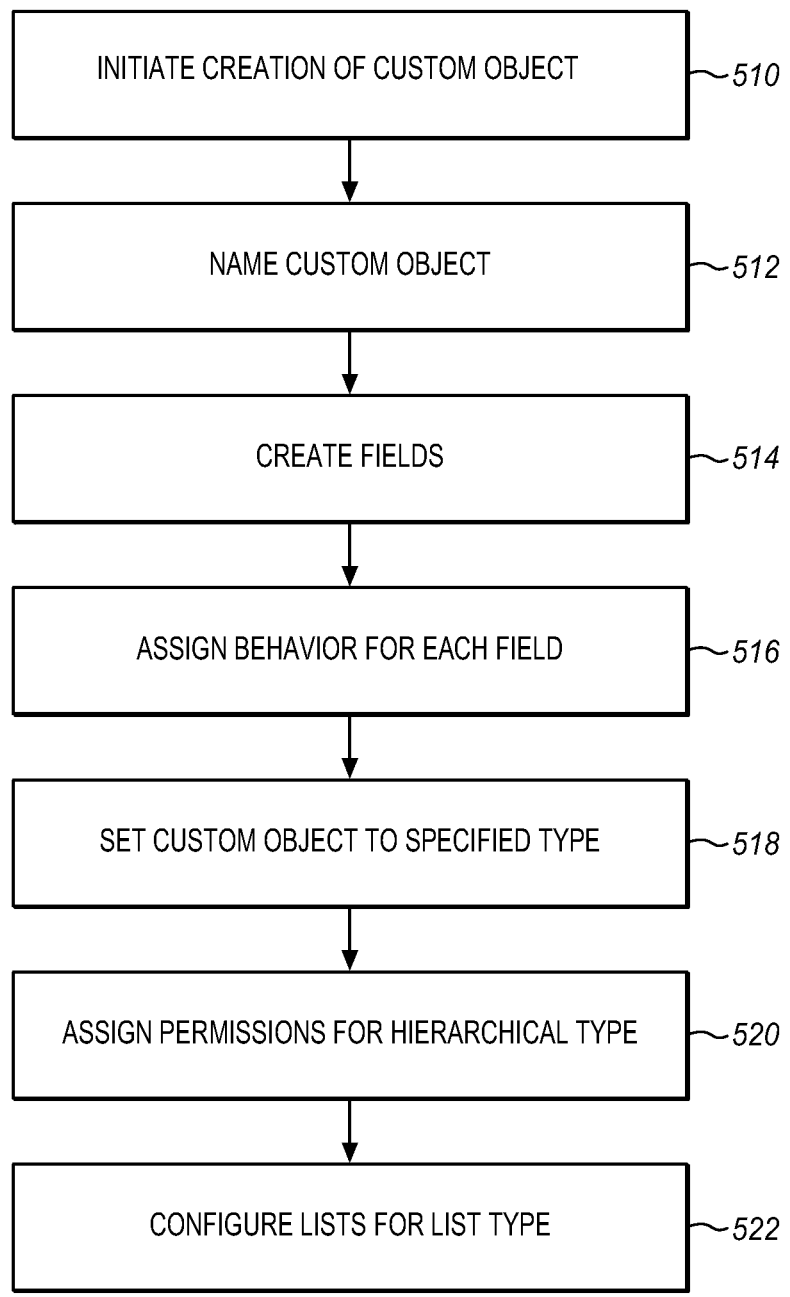
FIG. 5 is an operational flow diagram illustrating creating a custom setting in an embodiment.

FIG. 5 shows a process flow for establishing or editing custom setting and objects using the user interface described above. At block 510 a user or developer initiates the creation of a custom setting. The setting refers to a custom object that can be called by an API (Application Programming Interface) of a database system. The user can either select an existing custom setting from a list or create a new one.

Once the process is initiated, the user can name the custom object at block 512, the naming can include defining labels and descriptions and associating the custom object with an application or an API. Typically the application will call the API which will then refer to the custom settings to respond to the call from the application.

At block 514, the user or developer creates or edits fields for the custom object. The user interface as shown in FIG. 2B may present a list of all of the current fields for a current package of custom settings and may also present a list of possible additional fields. The user can edit or delete the existing fields and add new ones if desired. The user can also specify the parameters and behaviors of each field. This might include specifying a field as a time field so that user entries are properly received, parsed, formatted, and displayed. FIG. 2C provides example of different types of fields.

At block 516 a behavior is assigned for each field. This will typically be in the form of an action, however, the invention is not so limited. The behaviors may resemble those shown in FIG. 2C, however, the behavior may be an action such as display data, call data, modify data, etc.

At block 518, a user sets the custom object to a specified type. In the provided examples, there are two types, list or application and hierarchical. Other and additional types may be used depending on the particular implementation. At block 520, if the custom object is of a hierarchical type, then the user permissions to users regarding the created fields. On the other hand, at block 522, if the custom object is of a list type then the user may configure a list for the object As to assigning permissions, for a hierarchical type of custom setting, the permissions may also be hierarchical. In one example, permission values are first assigned to a primary level such as an organizational or group level. Then overrides are assigned at a second level, such as a group or individual user level.

System Overview

Figure 6:
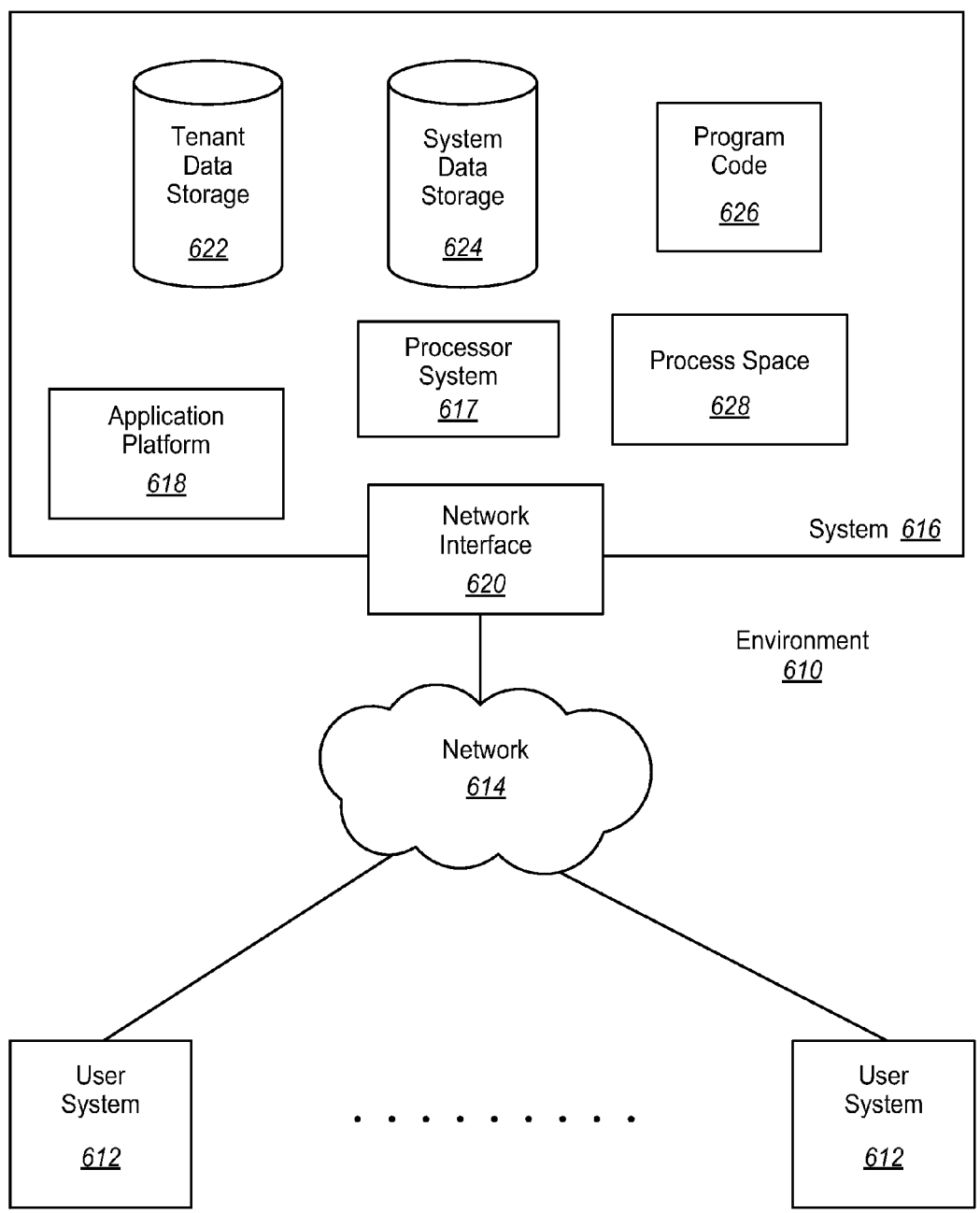
FIG. 6 illustrates a block diagram of an example of an environment wherein an on-demand database service might be used.

FIG. 6 illustrates a block diagram of an environment 610 wherein an on-demand database service might be used. Environment 610 may include user systems 612, network 614, system 616, processor system 617, application platform 618, network interface 620, tenant data storage 622, system data storage 624, program code 626, and process space 628. In other embodiments, environment 610 may not have all of the components listed and/or may have other elements instead of, or in addition to, those listed above.

Environment 610 is an environment in which an on-demand database service exists. User system 612 may be any machine or system that is used by a user to access a database user system. For example, any of user systems 612 can be a handheld computing device, a mobile phone, a laptop computer, a work station, and/or a network of computing devices. As illustrated in FIG. 6 (and in more detail in FIG. 7) user systems 612 might interact via a network 614 with an on-demand database service, which is system 616.

An on-demand database service, such as system 616, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 616" and "system 616" will be used interchangeably herein. A database image may include one or more database objects. A relational database management system (RDMS) or the equivalent may execute storage and retrieval of information against the database object(s). Application platform 618 may be a framework that allows the applications of system 616 to run, such as the hardware and/or software, e.g., the operating system. In an embodiment, on-demand database service 616 may include an application platform 618 that enables creation, managing and executing one or more applications developed by the provider of the on-demand database service, users accessing the on-demand database service via user systems 612, or third party application developers accessing the on-demand database service via user systems 612.

The users of user systems 612 may differ in their respective capacities, and the capacity of a particular user system 612 might be entirely determined by permissions (permission levels) for the current user. For example, where a salesperson is using a particular user system 612 to interact with system 616, that user system has the capacities allotted to that salesperson. However, while an administrator is using that user system to interact with system 616, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 614 is any network or combination of networks of devices that communicate with one another. For example, network 614 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the present invention might use are not so limited, although TCP/IP is a frequently implemented protocol.

User systems 612 might communicate with system 616 using TCP/IP and, at a higher network level, use other common Internet protocols to communicate, such as HTTP, FTP, AFS, WAP, etc. In an example where HTTP is used, user system 612 might include an HTTP client commonly referred to as a "browser" for sending and receiving HTTP messages to and from an HTTP server at system 616. Such an HTTP server might be implemented as the sole network interface between system 616 and network 614, but other techniques might be used as well or instead. In some implementations, the interface between system 616 and network 614 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 616, shown in FIG. 6, implements a web-based customer relationship management (CRM) system. For example, in one embodiment, system 616 includes application servers configured to implement and execute CRM software applications as well as provide related data, code, forms, webpages and other information to and from user systems 612 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 616 implements applications other than, or in addition to, a CRM application. For example, system 616 may provide tenant access to multiple hosted (standard and custom) applications, including a CRM application. User (or third party developer) applications, which may or may not include CRM, may be supported by the application platform 618, which manages creation, storage of the applications into one or more database objects and executing of the applications in a virtual machine in the process space of the system 616.

One arrangement for elements of system 616 is shown in FIG. 6, including a network interface 620, application platform 618, tenant data storage 622 for tenant data 623, system data storage 624 for system data 625 accessible to system 616 and possibly multiple tenants, program code 626 for implementing various functions of system 616, and a process space 628 for executing MTS system processes and tenant-specific processes, such as running applications as part of an application hosting service. Additional processes that may execute on system 616 include database indexing processes.

Several elements in the system shown in FIG. 6 include conventional, well-known elements that are explained only briefly here. For example, each user system 612 could include a desktop personal computer, workstation, laptop, PDA, cell phone, or any wireless access protocol (WAP) enabled device or any other computing device capable of interfacing directly or indirectly to the Internet or other network connection. User system 612 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 612 to access, process and view information, pages and applications available to it from system 616 over network 614. Each user system 612 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 616 or other systems or servers. For example, the user interface device can be used to access data and applications hosted by system 616, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 612 and all of its components are operator configurable using applications, such as a browser, including computer code run using a central processing unit such as an Intel Pentium® processor or the like. Similarly, system 616 (and additional instances of an MTS, where more than one is present) and all of their components might be operator configurable using application(s) including computer code to run using a central processing unit such as processor system 617, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 616 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments of the present invention can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 616 is configured to provide webpages, forms, applications, data and media content to user (client) systems 612 to support the access by user systems 612 as tenants of system 616. As such, system 616 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

FIG. 7 also illustrates environment 610. However, in FIG. 7 elements of system 616 and various interconnections in an embodiment are further illustrated. FIG. 7 shows that user system 612 may include processor system 612A, memory system 612B, input system 612C, and output system 612D. FIG. 7 shows network 614 and system 616. FIG. 7 also shows that system 616 may include tenant data storage 622, tenant data 623, system data storage 624, system data 625, User Interface (UI) 730, Application Program Interface (API) 732, PL/SOQL 734, save routines 736, application setup mechanism 738, applications servers 7001-700N, system process space 702, tenant process spaces 704, tenant management process space 710, tenant storage area 712, user storage 714, and application metadata 716. In other embodiments, environment 610 may not have the same elements as those listed above and/or may have other elements instead of, or in addition to, those listed above.

User system 612, network 614, system 616, tenant data storage 622, and system data storage 624 were discussed above in FIG. 6. Regarding user system 612, processor system 612A may be any combination of one or more processors. Memory system 612B may be any combination of one or more memory devices, short term, and/or long term memory. Input system 612C may be any combination of input devices, such as one or more keyboards, mice, trackballs, scanners, cameras, and/or interfaces to networks. Output system 612D may be any combination of output devices, such as one or more monitors, printers, and/or interfaces to networks. As shown by FIG. 7, system 616 may include a network interface 620 (of FIG. 6) implemented as a set of HTTP application servers 700, an application platform 618, tenant data storage 622, and system data storage 624. Also shown is system process space 702, including individual tenant process spaces 704 and a tenant management process space 710. Each application server 700 may be configured to tenant data storage 622 and the tenant data 623 therein, and system data storage 624 and the system data 625 therein to serve requests of user systems 612. The tenant data 623 might be divided into individual tenant storage areas 712, which can be either a physical arrangement and/or a logical arrangement of data. Within each tenant storage area 712, user storage 714 and application metadata 716 might be similarly allocated for each user. For example, a copy of a user's most recently used (MRU) items might be stored to user storage 714. Similarly, a copy of MRU items for an entire organization that is a tenant might be stored to tenant storage area 712. A UI 730 provides a user interface and an API 732 provides an application programmer interface to system 616 resident processes to users and/or developers at user systems 612. The tenant data and the system data may be stored in various databases, such as one or more Oracle™ databases.

Application platform 618 includes an application setup mechanism 738 that supports application developers' creation and management of applications, which may be saved as metadata into tenant data storage 622 by save routines 736 for execution by subscribers as one or more tenant process spaces 704 managed by tenant management process 710 for example. Invocations to such applications may be coded using PL/SOQL 734 that provides a programming language style interface extension to API 732. A detailed description of some PL/SOQL language embodiments is discussed in commonly owned U.S. Pat. No. 7,730,478 entitled, METHOD AND SYSTEM FOR ALLOWING ACCESS TO DEVELOPED APPLICATIONS VIA A MULTI-TENANT DATABASE ON-DEMAND DATABASE SERVICE issued Jun. 1, 2010 to Craig Weissman, which is incorporated in its entirety herein for all purposes. Invocations to applications may be detected by one or more system processes, which manages retrieving application metadata 716 for the subscriber making the invocation and executing the metadata as an application in a virtual machine.

Each application server 700 may be communicably coupled to database systems, e.g., having access to system data 625 and tenant data 623, via a different network connection. For example, one application server 7001 might be coupled via the network 614 (e.g., the Internet), another application server 700N-1 might be coupled via a direct network link, and another application server 700N might be coupled by yet a different network connection. Transfer Control Protocol and Internet Protocol (TCP/IP) are typical protocols for communicating between application servers 700 and the database system. However, it will be apparent to one skilled in the art that other transport protocols may be used to optimize the system depending on the network interconnect used.

In certain embodiments, each application server 700 is configured to handle requests for any user associated with any organization that is a tenant. Because it is desirable to be able to add and remove application servers from the server pool at any time for any reason, there is preferably no server affinity for a user and/or organization to a specific application server 700. In one embodiment, therefore, an interface system implementing a load balancing function (e.g., an F5 Big-IP load balancer) is communicably coupled between the application servers 700 and the user systems 612 to distribute requests to the application servers 700. In one embodiment, the load balancer uses a least connections algorithm to route user requests to the application servers 700. Other examples of load balancing algorithms, such as round robin and observed response time, also can be used. For example, in certain embodiments, three consecutive requests from the same user could hit three different application servers 700, and three requests from different users could hit the same application server 700. In this manner, system 616 is multitenant, wherein system 616 handles storage of, and access to, different objects, data and applications across disparate users and organizations.

As an example of storage, one tenant might be a company that employs a sales force where each salesperson uses system 616 to manage their sales process. Thus, a user might maintain contact data, leads data, customer follow-up data, performance data, goals and progress data, etc., all applicable to that user's personal sales process (e.g., in tenant data storage 622). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 616 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 616 might also maintain system level data usable by multiple tenants or other data. Such system level data might include industry reports, news, postings, and the like that are sharable among tenants.

In certain embodiments, user systems 612 (which may be client systems) communicate with application servers 700 to request and update system-level and tenant-level data from system 616 that may require sending one or more queries to tenant data storage 622 and/or system data storage 624. System 616 (e.g., an application server 700 in system 616) automatically generates one or more SQL statements (e.g., one or more SQL queries) that are designed to access the desired information. System data storage 624 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to the present invention. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method comprising:
    initiating by presenting a custom object main custom settings view the creation of a custom object that can be called by an API (Application Programming Interface) of a database system;
    naming the custom object based on receiving a name in the main custom settings view,
    creating fields for the custom object based on presenting a list of possible fields and receiving field selections;
    assigning a behavior for each field based on presenting a list of possible behaviors for selected fields and receiving a behavior selection;
    setting the custom object to a specified type based on presenting a list of possible types and receiving a type selection; and
    assigning permissions to users regarding the created fields when the custom object is of a hierarchical type.

2. The method of claim 1, wherein initiating the creation comprises selecting a custom object to edit.

3. The method of claim 1, wherein creating fields comprises defining a data type for each field.

4. The method of claim 1, wherein creating fields comprises defining an action for each field.

5. The method of claim 1, wherein assigning permissions comprises assigning permission values for hierarchical settings.

6. The method of claim 5, wherein assigning permission values comprises assigning permission values to a primary level and then assigning overrides to the assigned permission values at a second level.

7. The method of claim 1, wherein setting a type comprises choosing a list type or a hierarchical type.

8. The method of claim 7, further comprising if the custom object is of a list type then configuring a list for the object.

9. A non-transitory machine-readable storage medium carrying one or more sequences of instructions for creating custom objects for a database application, which instructions, when executed by one or more processors, cause the one or more processors to carry out the steps of:
    initiating by presenting a custom object main custom settings view the creation of a custom object that can be called by an API (Application Programming Interface) of a database system;
    naming the custom object based on receiving a name in the main custom settings view,
    creating fields for the custom object based on presenting a list of possible fields and receiving field selections;

assigning a behavior for each field based on presenting a list of possible behaviors for selected fields and receiving a behavior selection;

setting the custom object to a specified type based on presenting a list of possible types and receiving a type selection; and assigning permissions to users regarding the created fields when the custom object is of a hierarchical type.

10. The medium of claim 9, wherein creating fields comprises defining a data type for each field.

11. The medium of claim 10, wherein creating fields comprises defining an action for each field.

12. The medium of claim 9, wherein setting a type comprises choosing at least one of a list type and a hierarchical type.

13. An apparatus for creating custom objects for a database application, the apparatus comprising:

a processor; and one or more stored sequences of instructions which, when executed by the processor, cause the processor to carry out the steps of:

naming the custom object based on receiving a name in the main custom settings view, creating fields for the custom object based on presenting a list of possible fields and receiving field selections;

assigning a behavior for each field based on presenting a list of possible behaviors for selected fields and receiving a behavior selection;

setting the custom object to a specified type based on presenting a list of possible types and receiving a type selection; and assigning permissions to users regarding the created fields when the custom object is of a hierarchical type.

14. The apparatus of claim 13, further comprising a cache to store data populating the fields of the object.

15. The apparatus of claim 13, wherein initiating the creation comprises selecting a custom object to edit.

16. The apparatus of claim 13, wherein creating fields comprises defining a data type for each field.

17. The apparatus of claim 13, wherein creating fields comprises defining an action for each field.

18. The apparatus of claim 13, wherein assigning permissions comprises assigning permission values for hierarchical settings.

19. The apparatus of claim 18, wherein assigning permission values comprises assigning permission values to a primary level and then assigning overrides to the assigned permission values at a second level.

20. The apparatus of claim 13, wherein setting a type comprises choosing one of a list type and a hierarchical type.

21. The apparatus of claim 20, further comprising if the custom object is of a list type then configuring a list for the object.

* * * * *